US006128172A

United States Patent [19]

Feldtkeller

[11] Patent Number: 6,128,172

[45] Date of Patent: Oct. 3, 2000

[54] THERMAL PROTECTION CIRCUIT WITH THERMALLY DEPENDENT SWITCHING SIGNAL

[75] Inventor: Martin Feldtkeller, München, Germany

[73] Assignee: Infineon Technologies AG, Munich, Germany

[21] Appl. No.: 09/373,477

[22] Filed: Aug. 12, 1999

Related U.S. Application Data

[63] Continuation of application No. PCT/DE98/00402, Feb. 12, 1998.

[30] Foreign Application Priority Data

Feb. 12, 1997 [DE] Germany ........................... 197 05 338

[51] Int. Cl.[7] ........................................... H02H 5/04

[52] U.S. Cl. ......................... 361/93.8; 361/103; 327/512; 327/513

[58] Field of Search .................................... 361/103, 9.31, 361/93.8; 323/313, 314; 327/512, 513, 530, 545, 546

[56] References Cited

U.S. PATENT DOCUMENTS

| | | | |
|---|---|---|---|
| 3,825,778 | 7/1974 | Ahmed | 307/117 |
| 4,667,265 | 5/1987 | Stanojevic et al. | 361/103 |
| 4,701,639 | 10/1987 | Stanojevic | 327/83 |
| 4,789,819 | 12/1988 | Nelson | 323/314 |
| 5,099,381 | 3/1992 | Wilcox | 361/103 |
| 5,349,286 | 9/1994 | Marshall et al. . | |
| 5,589,792 | 12/1996 | Brokaw . | |
| 5,654,861 | 8/1997 | Pennisi | 361/103 |
| 5,796,280 | 8/1998 | Tuozzolo | 327/205 |

FOREIGN PATENT DOCUMENTS

| | | |
|---|---|---|
| 0170391A1 | 2/1986 | European Pat. Off. . |
| 0618658A1 | 10/1994 | European Pat. Off. . |
| 2239415 | 2/1974 | Germany . |

OTHER PUBLICATIONS

"Smart Power Ics", B Murari et al., Springer, 1996, pp. 423–427 (no month available).

*Primary Examiner*—Jeffrey Gaffin
*Assistant Examiner*—Kim Huynh
*Attorney, Agent, or Firm*—Herbert L. Lerner; Laurence A. Greenberg; Werner H. Stemer

[57] ABSTRACT

A thermal protection circuit having a reduced current consumption and requiring a reduced number of components, includes a first, a second, and a third current source. The third current source has a first transistor with an emitter connected to a first voltage supply terminal, a collector, and a base connected to the collector of the first transistor, and has a second transistor with a base, a collector connected to the collector of the first transistor and to the base of the first transistor. A voltage divider has a tap, a first voltage divider terminal connected to a second voltage supply terminal, and a second voltage divider terminal connected to the third current source. A third transistor has an emitter connected to the second voltage supply terminal, a collector connected to the first current source, and a base connected to the tap of the voltage divider. A temperature-dependent switching signal can be tapped at the collector of the third transistor. A fourth transistor has an emitter connected to the second voltage supply terminal, a base connected to the second voltage divider terminal, and a collector connected to the second current source and to the base of the second transistor.

11 Claims, 6 Drawing Sheets

THERMAL PROTECTION CIRCUIT WITH THERMALLY DEPENDENT SWITCHING SIGNAL

CROSS REFERENCE TO RELATED APPLICATION

This application is a continuation of International Application PCT/DE98/00402, filed Feb. 12, 1998, which designated the United States.

BACKGROUND OF THE INVENTION

Field of the Invention

The invention relates to a thermal protection circuit having a first bipolar transistor, whose emitter connection is connected to a terminal for a reference potential, whose collector connection is connected to a first current source and whose base connection is connected to a tap of a voltage divider. One terminal of the voltage divider is connected to the terminal for the reference potential.

The task of such thermal protection circuits, which are used in integrated power circuits for example, is to switch off circuit components having a high dissipation power when a defined temperature threshold is exceeded. This is done to protect the entire circuit, usually an IC, from being destroyed when it is not cooled. This necessitates a temperature-dependent switching signal which, at temperatures above the defined temperature threshold, has a value which can be distinguished unambiguously from values of the switching signal at temperatures below the defined temperature threshold. In the case of already known thermal protection circuits of this type, the pronounced dependence of the collector current on the temperature in the case of bipolar transistors connected in a common-emitter connection is utilized for generating the switching signal. Given a predetermined collector current, the base-emitter voltage of a bipolar transistor operated in a common-emitter connection decreases by a specific value per kelvin of a temperature increase. This specific value is approximately 2 millivolts per kelvin of the temperature increase in the case of silicon-based bipolar transistors. Since the collector current is, in turn, exponentially dependent on the base-emitter voltage if the transistor is in the linear control range, the collector current is thus exponentially dependent on the temperature, with the result that the collector current rises exponentially for a predetermined base-emitter voltage and temperature increase. If the current supplied by the current source connected to the collector connection no longer suffices to keep the bipolar transistor in the linear control range in the event of rising temperatures, the transistor reaches saturation and the collector potential decreases rapidly in relation to values at lower temperatures, whereby an unambiguously distinguishable switching signal is produced. In the case of already known thermal protection circuits which utilize such temperature dependencies of common-emitter bipolar transistors, a reference voltage source which is as exact as possible and is independent of temperature is required in order to set the base-emitter voltage and hence the transistor operating point. In order to generate such a reference voltage, it is possible to use for example bandgap circuits, as is described in “Smart-Power ICs” by Botti/Stefani, Springer Publishers, 1996, page 424 ff. or in Published European Patent Application EP 0 618 658 A1 assigned to the company SGS Thomson.

Circuits of this type have the disadvantage that the temperature accuracy of the protection circuit is greatly dependent on the accuracy of the reference voltage source. Another disadvantage is the considerable outlay on circuitry.

U.S. Pat. No. 5,589,792 describes a thermal protection circuit having two bipolar transistors of the same type, the emitters thereof being connected to a common terminal connection. Furthermore, two current sources are provided, which in each case impress a predetermined current into the collector connections of the two transistors. A third transistor enables a current flow through the first transistor, this current flow being caused by the first current source. A voltage divider controls the base of the second transistor in such a way that part of the base-emitter voltage of the first transistor is present. A signal can then be tapped on the collector of the second transistor when a predetermined temperature is exceeded. Thus, it is possible to dispense with a complicated circuit configuration for generating a reference voltage.

SUMMARY OF THE INVENTION

It is accordingly an object of the invention to provide a thermal protection circuit which overcomes the above-mentioned disadvantages of the heretofore-known circuits of this general type and which requires only little current for its operation. In addition to providing a thermal protection circuit having a low current consumption, it is a further object of the invention to provide a thermal protection circuit that can be realized with only a few components and hence in a space-saving manner.

With the foregoing and other objects in view there is provided, in accordance with the invention, a thermal protection circuit, which has a first voltage supply terminal, a second voltage supply terminal as well as a first, a second, and a third current source. The third current source has a first transistor with an emitter connection connected to the first voltage supply terminal, a collector connection, and a base connection connected to the collector connection of the first transistor. The third current source further has a second transistor with a base connection, a collector connection connected to the collector connection of the first transistor and to the base connection of the first transistor. The thermal protection circuit according to the invention also has a voltage divider having a tap, a first voltage divider terminal connected to the second voltage supply terminal, and a second voltage divider terminal connected to the third current source. The thermal protection circuit according to the invention further includes a third transistor having an emitter connection connected to the second voltage supply terminal, a collector connection connected to the first current source, and a base connection connected to the tap of the voltage divider. A temperature-dependent switching signal can be tapped at the collector connection of the third transistor. The thermal protection circuit according to the invention also has a fourth transistor having an emitter connection connected to the second voltage supply terminal, a base connection connected to the second voltage divider terminal, and a collector connection connected to the second current source and to the base connection of the second transistor.

The protection circuit according to the invention provides a fourth bipolar transistor, whose emitter connection is connected to the terminal for reference potential, whose collector connection is connected to a second current source and whose base connection is connected to a second terminal of the voltage divider. Consequently, the base-emitter voltage of the third bipolar transistor results from the base-emitter voltage of the fourth transistor through the use of the voltage divider. Since, as the temperature rises, the base-emitter voltage of the fourth transistor decreases for a predetermined collector current, which is given by the second current source, the base-emitter voltage of the third transistor also decreases. The operating points of the third transistor can be set inter alia by way of the divider ratio of the voltage divider in such a way that the collector current of the third transistor, which is necessary to keep the third transistor in the linear control range, rises as the temperature increases. If this collector current exceeds the current supplied by the first current source, then the third transistor reaches saturation, as a result of which the collector potential and the value of the switching signal, which can be tapped on the collector connection, decrease. The present thermal protection circuit contains only few components and can be realized in a space-saving manner particularly when the current sources are manufactured with MOS technology. In order to set the operating points of the fourth transistor, a third current source is provided, which is connected to the base connection and hence simultaneously to the second terminal of the voltage divider.

In accordance with another feature of the invention, the operating point setting is effected through the use of a first and a second transistor, the base of the second transistor being connected to the collector connection of the fourth transistor and the emitter connection of the second transistor being connected to the base connection of the fourth transistor. The collector connection of the second transistor is connected to the collector connection of the first transistor, whose emitter is connected to the first terminal of the supply voltage source. The collector connection and the base connection of the first transistor are connected to one another.

In accordance with a further feature of the invention, it is advantageous for the third transistor to have an emitter area which is by a factor of m larger than the emitter area of the fourth transistor. Given an identical base-emitter voltage, the collector current of the third transistor consequently has a value m times that of the collector current of the fourth transistor. This results, for a predetermined first and second current source, in a further possibility for setting the temperature threshold at which the switching signal decreases.

In accordance with yet another feature of the invention, it is preferable for the second current source, which supplies the collector current of the fourth transistor, and the first current source, which supplies the collector current of the third transistor, to form a current mirror such that the maximum possible collector current of the third transistor is dependent on the collector current of the fourth transistor.

In accordance with a further feature of the invention, the current mirror comprises a fifth and sixth transistor, whose emitter connections are in each case connected to a first terminal of a supply voltage source, in which case, moreover, the collector connection of the fifth transistor is connected to the collector connection of the third transistor and the collector connection of the sixth transistor is connected to the collector connection of the fourth transistor. Furthermore, the base connection of the fifth transistor is connected to the base connection of the sixth transistor, as a result of which the two bases are at a common potential.

In accordance with a further feature of the invention, the emitter area of the sixth transistor is by a factor of n larger than the emitter area of the fifth transistor. As a result of which, given the described connection of the fifth and sixth transistors to form the current mirror, the collector current which is supplied by the fifth transistor and which corresponds to the maximum collector current flowing through the third transistor corresponds to the n-th part of the collector current flowing through the sixth transistor, the magnitude of which, disregarding the base current of the second transistor, corresponds to the absolute value of the collector current of the fourth transistor.

In accordance with yet a further feature of the invention, the collector connection and the base connection of the first transistor are connected to the base of the fifth and sixth transistors.

In accordance with another feature of the invention, at least one of the transistors which form the current mirror and/or the third current source are provided as a MOS transistor, for example as a MOS-FET. This embodiment enables the current mirror and/or the third current source to be realized in a particularly space-saving manner. In order to make the values of the switching signal before and after the exceeding of the temperature threshold readily distinguishable, a hysteresis circuit, which amplifies the decrease in the values of the switching signal after the temperature threshold has been exceeded, is furthermore provided.

In accordance with another feature of the invention, the second voltage supply terminal is a reference-ground terminal.

In accordance with another feature of the invention, the third and fourth transistors are bipolar transistors.

Other features which are considered as characteristic for the invention are set forth in the appended claims.

Although the invention is illustrated and described herein as embodied in thermal protection circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The first through the sixth transistor in the claims are illustrated by the transistors T5, T6, T1, T2, T3, and T4 in the description of the preferred embodiments.

DESCRIPTION OF THE PREFERRED EMBODIMENTS

Figure 1:
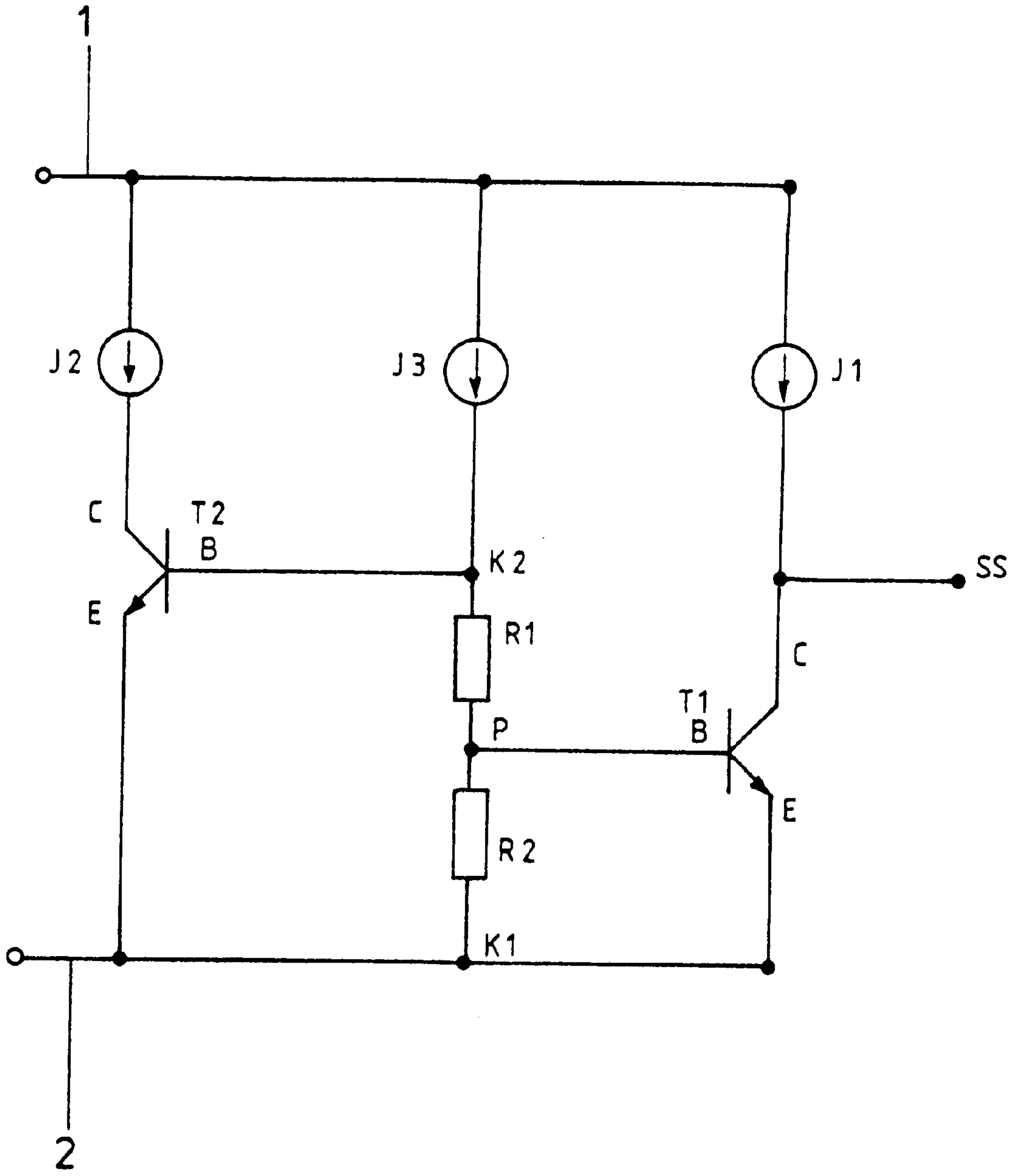
FIG. 1 is a circuit diagram of a first exemplary embodiment of a thermal protection circuit according to the invention.

Referring now to the figures of the drawings in detail, in which, unless specified otherwise, corresponding components are designated with the same reference numerals, and first, particularly, to FIG. 1 thereof, there is shown an embodiment of a thermal protection circuit according to the invention, having a first and second transistor T1, T2, a first, second, and third current source J1, J2, J3, and a voltage divider with a first and second resistor R1, R2. In the exemplary embodiment illustrated, the base B of the first transistor T1 is connected to a center tap P of the voltage divider, a first terminal K1 of which is connected to a terminal 2 for a reference potential or reference-ground potential. The base B of the second transistor T2 is connected to a second terminal K2 of the voltage divider. Both the emitter connection E of the first transistor T1 and the emitter connection E of the second transistor T2 are connected to the terminal 2 for the reference potential. As a result the following relationship is produced for the base-emitter voltage $U_{BE1}$ of the first transistor T1 which depends on the base-emitter voltage $U_{BE2}$ of the second transistor T2:

$$U_{BE1}=R2/(R1+R2)\cdot U_{BE2}=a\cdot U_{BE2}$$

with a <1 designating the voltage divider ratio of the voltage divider.

The collector connection C of the first transistor, on which a temperature-dependent switching signal SS can be tapped, is connected to a first current source J1, which determines the maximum collector current flowing through the first transistor T1. The collector connection C of the second transistor T2 is connected to a second current source J2, which determines the maximum collector current flowing through the second transistor T2. In order to set the operating point and the base-emitter voltage of the second transistor T2, respectively, a third current source J3 is provided, which is connected to the base connection B of the second transistor and to the second terminal K2 of the voltage divider.

Figure 2:
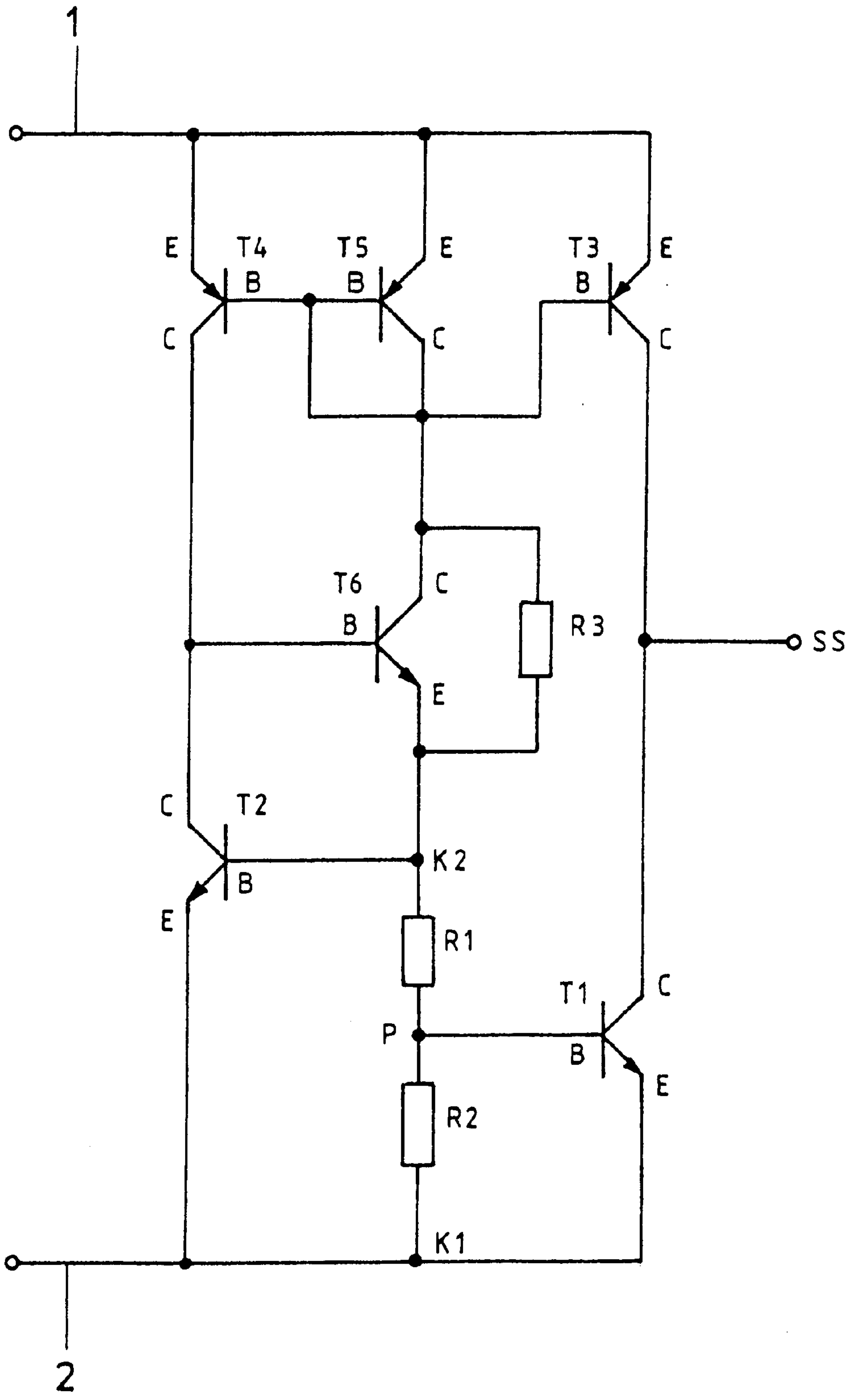
FIG. 2 is a circuit diagram of a second exemplary embodiment of a thermal protection circuit according to the invention with the first, second, and third current sources implemented with bipolar technology.

FIG. 2 shows an exemplary embodiment of a thermal protection circuit according to the invention, the current sources J1, J2, J3 illustrated in FIG. 1 being implemented using bipolar technology and, in addition, the first and second current sources J1, J2 being formed by a current mirror. FIG. 2 shows a third and a fourth transistor T3, T4, which form a current mirror. The collector connection C of the third transistor T3 is connected to the collector connection C of the first transistor T1, and the collector connection C of the fourth transistor T4 is connected to the collector connection of the second transistor T2. Both the emitter connection E of the third transistor T3 and the emitter connection E of the fourth transistor T4 are connected to a first terminal 1 of a supply voltage source. The base B of the third transistor T3 is connected to the base B of the fourth transistor T4, which are consequently at a common potential determined by the collector-emitter voltage and, respectively, the base-emitter voltage of a fifth transistor T5, whose emitter connection E is connected to the first terminal 1 of the supply voltage source and whose collector connection C is connected both to its own base connection B and to the base connection B of the third and fourth transistors T3, T4. The collector connection C of the fifth transistor T5 is furthermore connected to the collector connection C of a sixth transistor T6, whose emitter connection E is connected to the base B of the second transistor T2 and to the second terminal K2 of the voltage divider. The base connection B of the sixth transistor T6 is connected to the collector connection C of the second transistor T2. In the circuit described, the operating point of the second transistor T2 is set through the use of the fourth, fifth, and sixth transistors T4, T5, T6, the magnitude (absolute value) of the collector current flowing through the fourth transistor T4 corresponding to the collector current flowing through the second transistor T2, disregarding the base current of the sixth transistor T6. Since both, the base connection B and the emitter connection E of the third and fourth transistors T3, T4 are, due to the circuit configuration, at the same potential, the collector current flowing through the third transistor T3 corresponds to the collector current flowing through the fourth transistor T4, and, respectively, the collector current flowing through the fourth transistor T4 has a value n times that of the collector current flowing through the third transistor T3, if the fourth transistor T4 is chosen such that its emitter area is n times the emitter area of the third transistor T3. A third resistor R3 connected in parallel with the collector-emitter path of the sixth transistor T6 contributes to accelerating the setting of the operating point of the second transistor T2.

Figure 3:
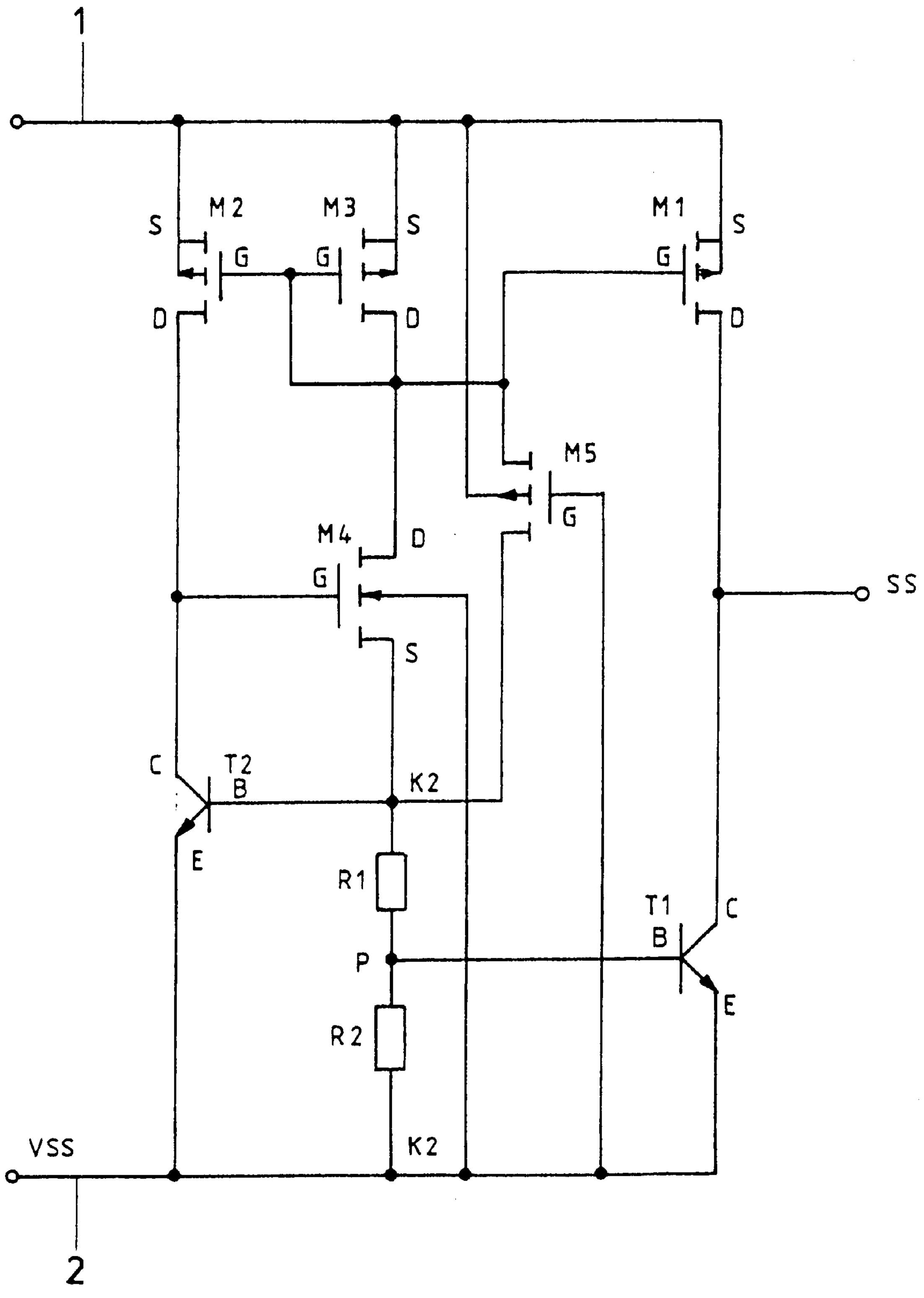
FIG. 3 is a circuit diagram of a third exemplary embodiment of a thermal protection circuit according to the invention with the first, second, and third current sources implemented with MOS technology.

FIG. 3 shows a further exemplary embodiment of a thermal protection circuit according to the invention, the bipolar transistors T3, T4, T5, T6 which are illustrated in FIG. 2 and form the current sources being replaced by a first, second, third and fourth MOS-FET, M1, M2, M3, M4. The drain connection D of the first MOS-FET M1 is connected to the collector connection C of the first transistor T1, and the drain connection D of the second MOS-FET M2 is connected to the collector connection C of the second transistor T2. The source connections S of the first, second and third MOS-FETs M1, M2, M3 are in each case connected to the first terminal 1 of the supply voltage source, the drain connection D of the third MOS-FET M3 being connected to the drain connection D of the fourth MOS-FET M4 and, furthermore, the drain connection D of the third MOS-FET M3 being connected to the gate connection G of the first MOS-FET, to the gate connection G of the second MOS-FET, and to the gate connection G of the third MOS-FET. The gate connection G of the fourth MOS-FET M4 is connected to the collector connection C of the second transistor T2, and the source connection S of the fourth MOS-FET M4 is connected to the base connection B of the second transistor T2 and to the second terminal K2 of the voltage divider. In the exemplary embodiment of a thermal protection circuit as illustrated in FIG. 3, the third resistor illustrated in FIG. 2 is replaced by a fifth MOS-FET M5, whose gate connection G is connected to the terminal 2 for the reference potential VSS. The use of transistors with MOS technology means that the thermal protection circuit illustrated in FIG. 3 can be realized in a way such that it occupies less space than the thermal protection circuit illustrated in FIG. 2.

Figure 4:
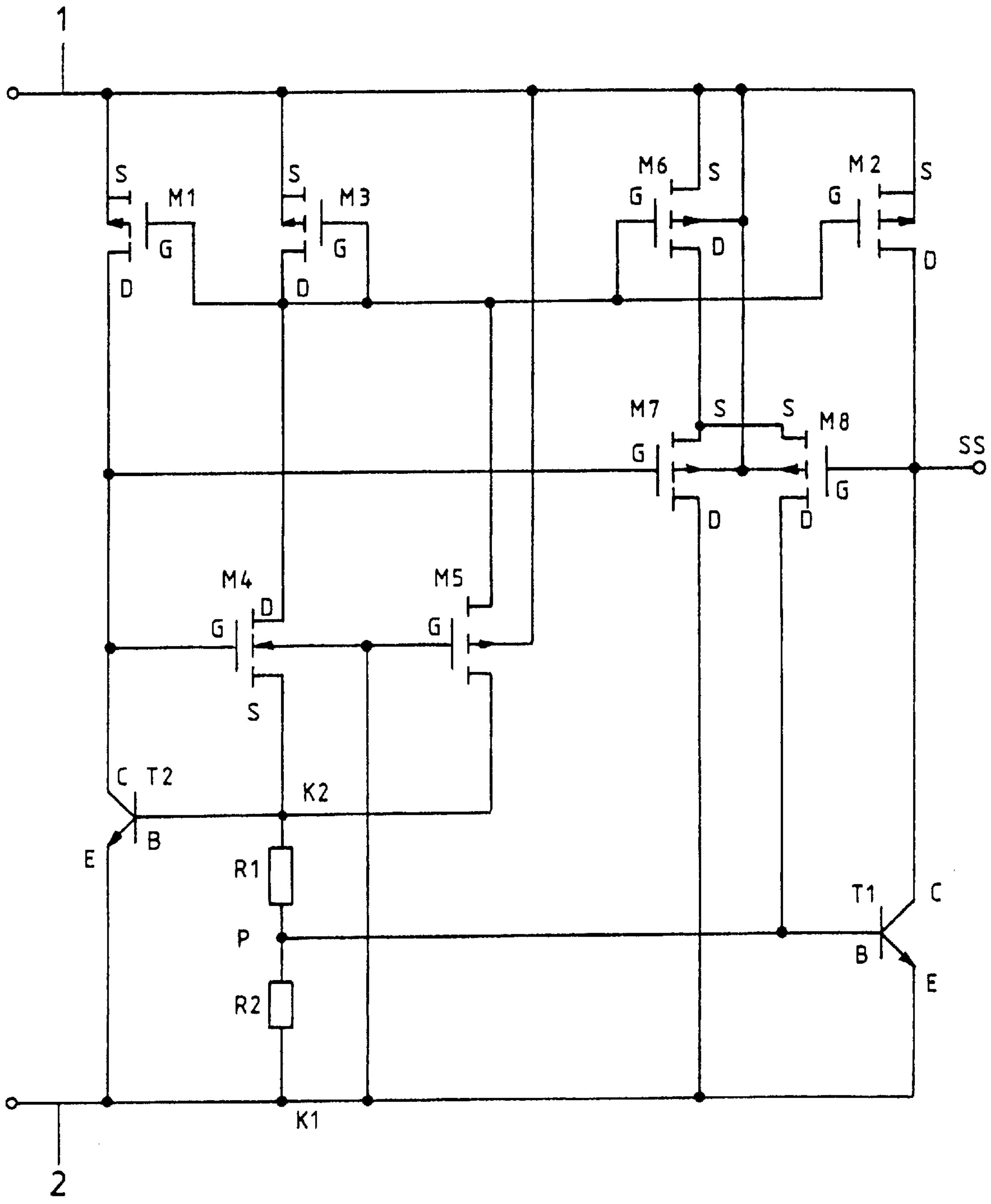
FIG. 4 is a circuit diagram of a further embodiment of a thermal protection circuit according to the invention with a hysteresis circuit.

FIG. 4 shows the thermal protection circuit illustrated in FIG. 3 additionally augmented by a hysteresis circuit, comprising a sixth, seventh and eighth MOS-FET M6, M7, M8. The source connection S of the sixth MOS-FET M6 is connected to the first terminal 1 of the supply voltage source, and the gate connection G of the sixth MOS-FET is connected to the gate connections G of the first, second, and third MOS-FETs M1, M2, M3. The source connections S of the seventh and eighth MOS-FETs M7, M8 are in each case connected to the drain connection D of the sixth MOS-FET M6, the drain connection D of the seventh MOS-FET is connected to the terminal 2 for the reference potential (reference-ground potential), and the drain connection D of the eighth MOS-FET M8 is connected to the base connection B of the first transistor T1. The gate connections G of the seventh and eighth MOS-FETS M7, M8 are connected to the collector connection C of the second transistor T2 and to the collector connection C of the first transistor T1, respectively. The task of the hysteresis circuit described is to amplify the decrease in the collector potential when a predetermined temperature threshold is exceeded, in order to make the switching signal more clearly distinguishable from switching signals at lower temperatures, wherein the collector potential of the first transistor T1 decreases from this threshold onward. The temperature threshold starting from which the collector potential of the first transistor T1 distinctly decreases is characterized in that the collector current necessary to keep the first transistor T1 in the linear control range can no longer be provided by the second MOS-FET M2. The drain potential of the second MOS-FET M2 and hence the gate potential of the eighth MOS-FET M8 therefore decrease relative to the drain potential of the sixth MOS-FET M6. The eighth MOS-FET M8 is thus turned on (conductive) and a current flows via the sixth MOS-FET M6, the eighth MOS-FET M8 and the second resistor R2 of the voltage divider in the direction of the terminal 2 for reference potential. As a result of the current additionally flowing through the second resistor R2, the base-emitter voltage present at the first transistor T1 is increased, as a result of which the collector current required to keep the first transistor T1 in the linear control range rises still further, which brings about a further decrease in the collector potential of the first transistor T1.

Figure 5:
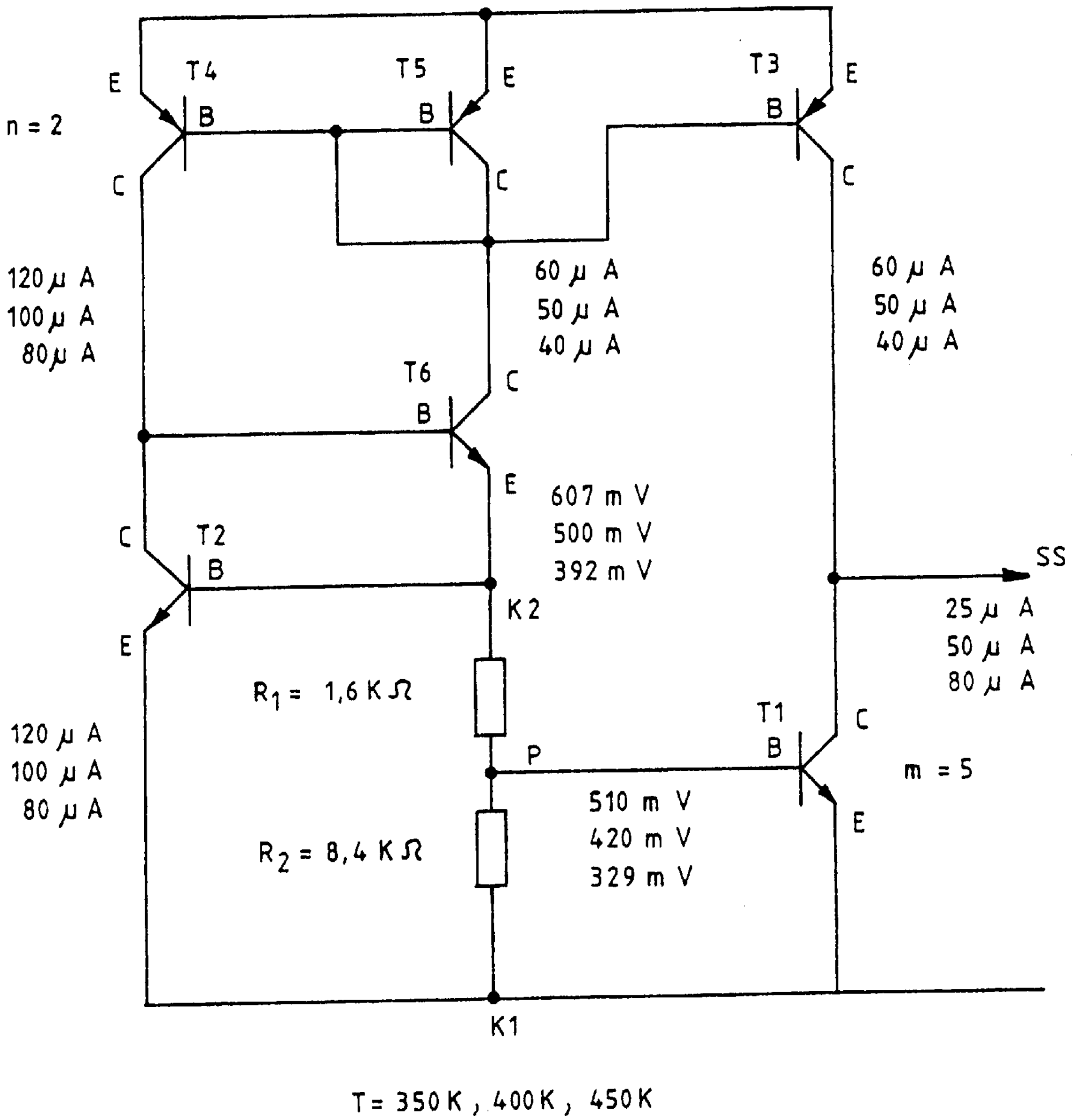
FIG. 5 is a circuit diagram illustrating the operation of a thermal protection circuit according to the second exemplary embodiment of the invention wherein selected currents and voltages at selected temperatures are specified.
Figure 6:
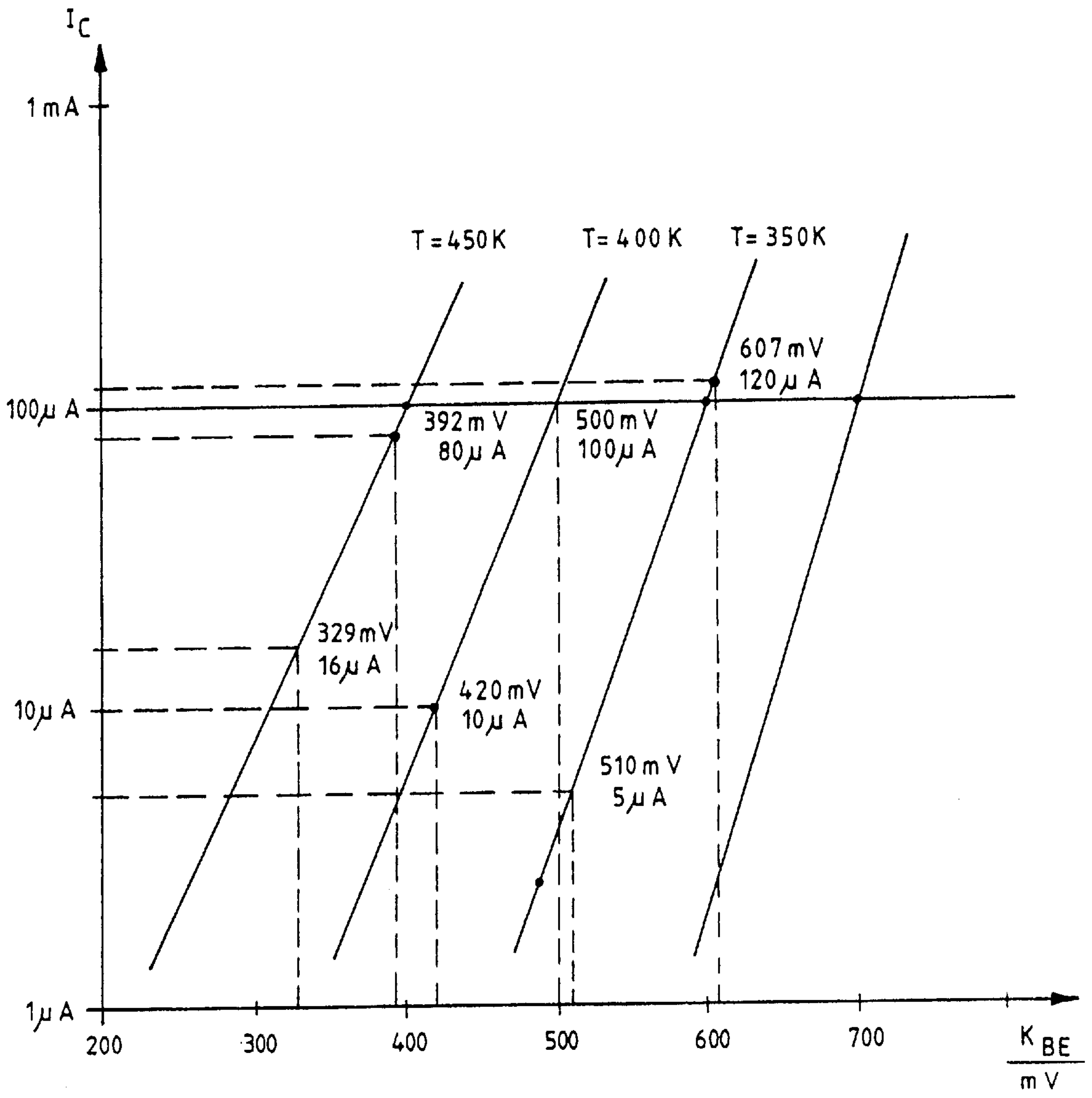
FIG. 6 is a diagram illustrating the dependence of the collector current on the temperature and the base-emitter voltage in the case of the bipolar transistors used in FIG. 5.

FIG. 6 shows the dependence of a collector current $I_C$ on the base-emitter voltage $U_{BE}$ and the temperature T of an exemplary bipolar transistor. Using this exemplary bipolar transistor, the method of operation of a thermal protection circuit of the invention, according to the second exemplary embodiment illustrated in FIG. 2, shall be explained. The thermal protection circuit illustrated in FIG. 2 is specified in FIG. 5, with the third resistor being neglected, wherein selected currents and voltages at temperatures of T=350K, T=400K and T=450K are specified. The current and voltage values for different temperatures are in each case specified in a list one underneath the other, the values being specified with rising temperature from top to bottom. The following explanation of the method of operation is given with all the base currents considered negligible. The circuit was dimensioned for a temperature of T=400K. Assuming that the bipolar transistors used satisfy the characteristic curves specified in FIG. 6, and with the two resistors R1, R2 of the voltage divider being selected as R1=1.6 kΩ and R2=8.4 kΩ, the operating point of the second transistor T2 is characterized by a base-emitter voltage of 500 mV and a collector current of 100 μA at a temperature of T=400K. This operating point is set through the use of the fourth, fifth, and sixth transistors T4, T5, T6. With the base current of the sixth transistor T6 being disregarded, a collector current likewise of 100 μA is produced for the fourth transistor T4. In accordance with the voltage divider ratio a=0.84 of the voltage divider used, the base-emitter voltage of the first transistor is 420 mV. In the example illustrated, the emitter area of the first transistor is five times the emitter area of the second transistor T2, with the result that the collector current flowing through the first transistor T1 has a value of five times the value of 10 μA which is shown in the characteristic curves for a base-emitter voltage of 420 mV. The emitter area of the fourth transistor T4 is twice the emitter area of the third and fifth transistors T3, T5, with the result that the collector current of the fourth transistor has a value twice that of the collector current of the third and fifth transistors T3, T5, this being 50 μA in each case.

In the case of the present circuit, when the temperature is reduced to T=350K, the operating point resulting for the second transistor T2 is characterized by a base-emitter voltage of 607 mV and a collector current of 120 μA. The base-emitter voltage of the first transistor T1 necessarily results from the base-emitter voltage of the second transistor T2 and the voltage divider as 510 mV. From the characteristic curve for a temperature of 350K, a collector current of 5 μA results for such a base-emitter voltage. This collector current however, due to the use of a transistor with an emitter area enlarged by the factor five, has a value five times that of the collector current that can be seen in the characteristic curve, and is thus 25 μA. On account of the connection of the third and fourth transistors T3, T4 to form a current mirror and the doubled emitter area of the fourth transistor T4 compared with the third transistor T3, the collector current of the third transistor T3 is half the collector current of the fourth transistor T4 and is thus 60 μA. The collector current of the third transistor T3 specified as 60 μA should be regarded as the maximum possible collector current. Since a collector current which substantially exceeds the specified 25 μA cannot flow through the first transistor T1 in the case of the operating point thereof which is present for T=350K, only a collector current of 25 μA flows through the third transistor T3 as well, as a result of which this transistor possibly reaches saturation. As the temperature decreases to T=350K, the first transistor T1 continues to remain in the linear control range, and the collector potential and hence the switching signal SS do not, therefore, change significantly.

In the event of the temperature rising to T=450K, an operating point which is characterized by a base-emitter voltage of 392 mV and a collector current of 80 μA results for the second transistor T2. In accordance with the divider ratio a=0.84, the following are thus produced for the first transistor: a base-emitter voltage of 329 mV and a collector current of 80 μA, which, in accordance with the enlarged emitter area, has a value five times the value of 16 μA that can be seen in the characteristic curve. In accordance with the emitter area ratio of the third and fourth transistors T3, T4, the maximum collector current flowing through the third transistor T3 is half the collector current of 80 μA flowing through the fourth transistor T4, namely 40 μA. The maximum collector current of 40 μA supplied by the third transistor T3 is smaller than the collector current of 80 μA associated with a base-emitter voltage of 329 mV given a five-fold emitter area. The collector current supplied by the third transistor T3 does not suffice to keep the first transistor T1 in the linear control range for the given base-emitter voltage of 329 mV. The first transistor T1 thus reaches saturation and the collector potential and hence the switching signal SS decrease rapidly in relation to collector potential values in the linear control range. This fact becomes clear from customary transistor characteristic curves in which the collector current is plotted as a function of the collector-emitter voltage. In the linear control range, the collector current is only slightly dependent on the collector-emitter voltage or on the collector potential, whereas the collector current is greatly dependent on the collector potential or the collector-emitter voltage in the saturation region.

Instead of the bipolar transistors used for the first and second transistors in the exemplary embodiments, it is also possible to use MOS transistors. A corresponding dimensioning of the voltage divider must however be provided. The first through the sixth transistor as defined in the following claims correspond to the transistors T5, T6, T1, T2, T3, and T4 in the description of the preferred embodiments.

I claim:

1. A thermal protection circuit, comprising:

a first voltage supply terminal and a second voltage supply terminal;

a first, a second, and a third current source;

said third current source having a first transistor with an emitter connection connected to said first voltage supply terminal, a collector connection, and a base connection connected to said collector connection of said first transistor, and having a second transistor with a base connection, a collector connection connected to said collector connection of said first transistor and to said base connection of said first transistor;

a voltage divider having a tap, a first voltage divider terminal connected to said second voltage supply terminal, and a second voltage divider terminal connected to said third current source;

a third transistor having an emitter connection connected to said second voltage supply terminal, a collector connection connected to said first current source, and a base connection connected to said tap of said voltage divider, a temperature-dependent switching signal being tappable at said collector connection of said third transistor; and a fourth transistor having an emitter connection connected to said second voltage supply terminal, a base connection connected to said second voltage divider terminal, and a collector connection connected to said second current source and to said base connection of said second transistor.

2. The thermal protection circuit according to claim 1, wherein said third transistor and said fourth transistor each have a respective emitter area, said emitter area of said third transistor being larger that said emitter area of said fourth transistor by a given factor.

3. The thermal protection circuit according to claim 1, wherein said first current source and said second current source are configured to form a current mirror.

4. The thermal protection circuit according to claim 3, wherein said current mirror includes a fifth transistor and a sixth transistor, said fifth transistor has an emitter connection connected to said first voltage supply terminal, a collector connection connected to said collector connection of said third transistor, and a base connection, said sixth transistor has an emitter connection connected to said first voltage supply terminal, a collector connection connected to said connector connection of said fourth transistor, and a base connection connected to said base connection of said fifth transistor.

5. The thermal protection circuit according to claim 4, wherein said base connections of said first, fifth, and sixth transistors are connected to one another.

6. The thermal protection circuit according to claim 4, wherein said fifth transistor and said sixth transistor each have a respective emitter area, said emitter area of said sixth transistor being larger that said emitter area of said fifth transistor by a given factor.

7. The thermal protection circuit according to claim 4, wherein at least one of said fifth and sixth transistors is a MOS transistor.

8. The thermal protection circuit according to claim 1, wherein at least one of said first and second transistors is a MOS transistor.

9. The thermal protection circuit according to claim 1, including a hysteresis circuit.

10. The thermal protection circuit according to claim 1, wherein said second voltage supply terminal is a reference-ground terminal.

11. The thermal protection circuit according to claim 1, wherein said third and fourth transistors are bipolar transistors.

* * * * *